J. T. LANGLEY & E. THOMAS.
GAGE COCK.
APPLICATION FILED AUG. 27, 1912.

1,051,899.

Patented Feb. 4, 1913.

Witnesses:

James T. Langley
Edwin Thomas Inventors,
By R. C. Wright
Atty.

UNITED STATES PATENT OFFICE.

JAMES T. LANGLEY, OF PORTLAND, AND EDWIN THOMAS, OF LA GRANDE, OREGON.

GAGE-COCK.

1,051,899.      Specification of Letters Patent.      Patented Feb. 4, 1913.

Application filed August 27, 1912. Serial No. 717,273.

*To all whom it may concern:*

Be it known that we, JAMES T. LANGLEY and EDWIN THOMAS, citizens of the United States, the former residing at Portland, in the county of Multnomah, the latter at La Grande, in the county of Union, both in the State of Oregon, have jointly invented a new and useful Improvement in Gage-Cocks, of which the following is a specification, reference being had to the accompanying drawings.

Our invention relates to a class of cocks used in and with boilers or reservoirs, either for gaging, or to carry steam, gas, or other fluid from one place to another.

The object of our invention is to provide a gage-cock, the valve of which can be ground to place in its seat without removal of the gage-cock, also one which can be completely and thoroughly cleaned while the valve is under pressure, and likewise without removal. The device we have thus invented is simple, cheaply constructed, and applicable to all forms of boilers.

We attain the foregoing objects, as well as other advantages, by the construction, combination and arrangement of parts, illustrated in the accompanying drawings which form a part hereof.

Figure 4:
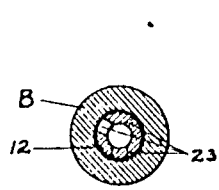
Figure 2:
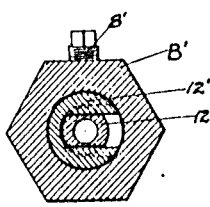
Figure 3:
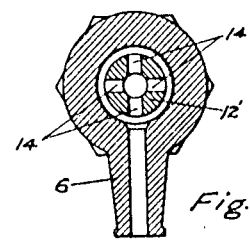
Figure 1:
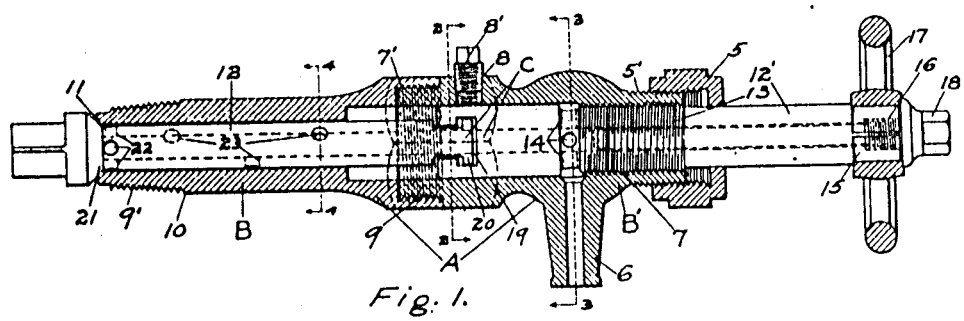

Figure 1. is a sectional view of the device longitudinally through its center. Fig. 2. is a sectional view on the line 2—2 of Fig. 1. Fig. 3. is a sectional view on the line 3—3 of Fig. 1. Fig. 4. is a sectional view on the line 4—4 of Fig. 1.

Like letters or numerals refer to like parts throughout the views where the same are used as references.

A is the body of the gage-cock and is composed of two members B—B' which are joined together, and have circular longitudinal openings through each.

5 is a threaded packing nut. The outer end of the member B' has a thread 5' to receive the nut 5.

6 is a lateral outlet in the member B'.

The member B' has an interior left hand thread 7 and an outer left hand thread 7' on its joining end, also a threaded opening 8 and a threaded screw 8' to close the opening. The member B has an interior left hand thread 9 in its joining end, also an exterior thread 9' on its opposite end 10. It also has a valve seat 11 within its end 10.

C is a spindle comprising two cylindrical members 12—12'. The member 12' has a longitudinal opening throughout its length and has an exterior left hand thread 13 in a suitable place. It also has lateral openings 14 near the end beyond the thread 13. Its outer end 15 is squared and has an interior thread 16. A hand-wheel is placed upon the end 15 and retained in place by the screw 18. In the screw 18 also is a plug in the end of the member B'. In the inner end of the member 12' the female part 19 of a T joint is formed. The spindle member 12 has the male part 20 of the T joint formed in its joining end to be received by the female part 19 of the member 12'. The valve 21 is formed in the opposite end of the member 12 and is received in the seat 11. Immediately adjacent to the valve of the member 12 are lateral openings 22 therein. Other lateral openings 23 are also formed at suitable places therein. The left hand threads described are of the same pitch. The male and female parts 19 and 20 of the T joint are formed so that there is space about them to permit of a longitudinal play of the members 12—12' when they are rotated to draw them either apart or together so they shall engage one another at the joint. The spindle member 12 is recessed from its joining end as far as the valve 21.

It will now be seen that the thread 9' permits the gage-cock to be secured within an opening in a boiler. When thus in place and the valve is in its seat, the handle 17 is rotated to the left which causes the spindle to move inward toward the boiler and so makes the valve 21 leave its seat 11. Thereupon the water or steam may pass through the openings 22 then through the hollow spindle members to the openings 14 whence it passes out through the outlet 6. Upon rotating the handle 17 to the right, the valve 21 is returned to its seat 11. It will be further seen that by reason of the play in the T joint of the spindle members, the valve can be rotated in its seat without opening it, a sufficient distance to grind it to place when it becomes coated with extraneous matter collected. The thread 7 on the member 12' is formed with a pitch which is so related to the slack or play in the T joint that the valve may be rotated in its seat a pre-determined distance before it opens and after it closes. Upon rotating the handle 17 to open the valve it will be seen that the valve must rotate in its seat this pre-determined distance before it begins to open. Upon moving the handle 17 in the opposite direction it will be seen that as soon as the valve has been given the longitudinal play in the T joint the pressure drives it to the seat and the movement of the handle further rotates it there until it is secured in closed position. Also that when steam passes through the openings 23 of the member 12 it cleanses the surface of same as well as the interior surface of the member B of the body and that part of the member B' as far as the outlet 6. The circulation of the water or steam about these parts does not prevent its perfect confinement until discharged through the outlet as intended. It will also be observed that by reason of the left handed threads of the same pitch the member B' can be unscrewed while the pressure is still on the valve 21. The spindle member 12' can then be released from the T joint and both parts cleaned with suitable instruments without reducing pressure on the valve. The parts can then be replaced as before and the gage-cock is ready for operating as above described. The screw 8' is provided for the purpose of introducing oil within the body as may be desired.

We are aware that other gage-cocks are made with a valve having a stem somewhat like the member 12 of our spindle. We do however contend that there are none which have two hollow spindle members with a T joint having play like ours, a body with two parts, and the left handed threads of the same pitch, as described, which thus permit the grinding of the valve in its seat while under pressure and the removal of part of the body while the valve is under pressure.

The spindle members 12—12' being inclosed within a body of sufficient length, and in close rotating engagement therein, this insures a perfect alinement and hence a perfect seating of the valve, notwithstanding the loose T joint. This enables the operator to grind the valve in its seat perfectly.

Having thus described our invention we claim:

1. A gage-cock comprising a body having two members B—B' joined at the ends, the member B having a valve seat in its free end, the member B' having a packing nut on its free end and a lateral outlet, also a thread in its interior, a spindle having two members 12—12' joined at their ends by a T joint with a suitable longitudinal playing space therein, the member 12 having a valve on its free end formed to be received in said valve seat, lateral openings adjacent to the valve and a longitudinal recess from its joining end to the valve, the member 12' being threaded without for a suitable distance, said thread having a pitch so related to the playing space in the aforesaid T joint that the valve on the member 12 may be rotated a pre-determined distance in its seat without opening or closing it, also having lateral openings in a suitable position, and a longitudinal opening throughout its length, means to close said opening at the free end of said member, substantially as described.

2. A gage-cock comprising a body having two members B—B' joined at the ends, with left hand threads, the member B having a valve seat in its free end, the member B' having a packing nut on its free end and a lateral outlet, also a left hand thread in its interior, a spindle having two members 12—12' joined at their ends by a T joint with a suitable longitudinal playing space therein, the member 12 having a valve on its free end formed to be received in said valve seat, lateral openings adjacent to the valve and a longitudinal recess from its joining end to the valve, the member 12' having a left hand thread without for a suitable distance, said thread having a pitch so related to the playing space in the aforesaid T joint that the valve on the member 12 may be rotated a pre-determined distance in its seat without opening or closing it, also having lateral openings in a suitable position, and a longitudinal opening throughout its length, means to close said opening at the free end of said member, means to secure the body in a reservoir and means to rotate the spindle, substantially as described.

JAMES T. LANGLEY.
EDWIN THOMAS.

Witnesses:
E. S. BUSH,
JNO. S. HODGIN.